United States Patent
Xiang et al.

(10) Patent No.: US 9,743,361 B2
(45) Date of Patent: Aug. 22, 2017

(54) NETWORK ACCESS METHOD, DEVICE, AND SYSTEM FOR DETECTING INTERFERENCE AND REDUCING INTERFERENCE BETWEEN INTERFERING CHANNELS

(71) Applicant: Huawei Device Co., Ltd., Shenzhen (CN)

(72) Inventors: Chao Xiang, Xi'an (CN); Hongfei Tian, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 105 days.

(21) Appl. No.: 14/569,523

(22) Filed: Dec. 12, 2014

(65) Prior Publication Data
US 2015/0098429 A1    Apr. 9, 2015

Related U.S. Application Data

(63) Continuation of application No. PCT/CN2014/076646, filed on Apr. 30, 2014.

(30) Foreign Application Priority Data

Jun. 27, 2013 (CN) .......................... 2013 1 0261259

(51) Int. Cl.
*H04W 52/24* (2009.01)
*H04W 52/16* (2009.01)
(Continued)

(52) U.S. Cl.
CPC ........ *H04W 52/243* (2013.01); *H04B 17/318* (2015.01); *H04W 52/16* (2013.01);
(Continued)

(58) Field of Classification Search
None
See application file for complete search history.

(56) References Cited

U.S. PATENT DOCUMENTS 8,340,580 B1 * 12/2012 Epstein ................ H04B 1/1027
455/114.2
9,107,172 B1    8/2015 Epstein
(Continued)

FOREIGN PATENT DOCUMENTS

| CN | 102256336 A | 11/2011 |
|---|---|---|
| CN | 102595543 A | 7/2012 |

(Continued)

*Primary Examiner* — Donald Mills
*Assistant Examiner* — Peter Chen
(74) *Attorney, Agent, or Firm* — Slater Matsil, LLP (57) ABSTRACT

A network access method, device, and system. The method includes: detecting, by a mobile wireless interconnection device, whether interference exists between a first channel and a second channel, where the first channel is between the mobile wireless interconnection device and a station, and the second channel is between the mobile wireless interconnection device and a hotspot access device; if interference exists, reducing, by the mobile wireless interconnection device, its own transmit power, so that no interference exists between the first channel and the second channel, and the station accesses the Internet by using the mobile wireless fidelity device and the hotspot access device.

15 Claims, 7 Drawing Sheets

(51) Int. Cl.
*H04W 72/08* (2009.01)
*H04W 76/02* (2009.01)
*H04B 17/318* (2015.01)

(52) U.S. Cl.
CPC ....... *H04W 72/082* (2013.01); *H04W 76/025* (2013.01); *H04W 52/245* (2013.01); *Y02B 60/50* (2013.01)

(56) References Cited

U.S. PATENT DOCUMENTS

| | | | | |
|---|---|---|---|---|
| 2006/0270433 | A1* | 11/2006 | Kelton | H04W 52/26 455/522 |
| 2007/0097912 | A1* | 5/2007 | Kawaguchi | H04W 72/06 370/329 |
| 2011/0283122 | A1* | 11/2011 | Ohara | G06F 1/1632 713/310 |
| 2012/0164948 | A1* | 6/2012 | Narasimha | H04W 72/1215 455/63.1 |
| 2013/0172040 | A1 | 7/2013 | Yamamoto | |
| 2013/0288742 | A1 | 10/2013 | Yao et al. | |
| 2013/0322259 | A1* | 12/2013 | Chung | H04L 1/0035 370/241 |
| 2014/0036705 | A1 | 2/2014 | Ma | |
| 2015/0163806 | A1* | 6/2015 | Kobayashi | H04W 16/14 370/329 |

FOREIGN PATENT DOCUMENTS

| | | |
|---|---|---|
| CN | 102892190 A | 1/2013 |
| CN | 102917406 A | 2/2013 |
| EP | 2472983 A1 | 7/2012 |
| JP | 2011071705 A | 4/2011 |
| JP | 2012080192 A | 4/2012 |
| JP | 2012244317 A | 12/2012 |
| JP | 2013046398 A | 3/2013 |
| JP | 2014060696 A | 4/2014 |
| WO | 2012088270 A1 | 6/2012 |

* cited by examiner

NETWORK ACCESS METHOD, DEVICE, AND SYSTEM FOR DETECTING INTERFERENCE AND REDUCING INTERFERENCE BETWEEN INTERFERING CHANNELS

This application is a continuation of International Application No. PCT/CN2014/076646, filed on Apr. 30, 2014, which claims priority to Chinese Patent Application No. 201310261259.7, filed on Jun. 27, 2013, both of which are hereby incorporated by reference in their entireties.

TECHNICAL FIELD

The present invention relates to the field of communications technologies, and in particular, to a network access method, device, and system.

BACKGROUND

With the development of mobile communications technologies, a user may access a wide area network (WAN) in multiple manners. For example, a WAN port on a mobile wireless interconnection (Wireless Fidelity, WiFi) device may include an Ethernet port, a WiFi station (Station, STA) port, and a 3G/4G (third generation/fourth generation of mobile telecommunications technology) port, and the user may access the WAN by using any one of the three ports. However, when the user performs data transmission by using the 3G/4G port, it may result in relatively high burden on an operator's network and may cause a problem of a relatively high tariff. Different from an operator's network, a local area network (LAN) usually accesses a wired network, for example, accesses an optical fiber network, by using a WiFi network. The WiFi network has features such as high performance and a low tariff. Therefore, resources of two networks may be coordinated in a unified manner. After entering an area covered by a WiFi network, a mobile WiFi device can automatically hand over to the WiFi network by using a WiFi hotspot and accesses the Internet by using the WiFi network, whereas the mobile WiFi device hands over back to the 3G/4G network only when no nearby WiFi hotspot is available.

At present, most mobile WiFi devices use a single-chip WiFi solution to implement WiFi uplink and downlink functions, and use a channel follow-up policy. After a WiFi uplink connects to a new operator's access point (AP), an AP in the mobile WiFi device also follows the WiFi uplink channel to switch its own channel, that is, the uplink and the downlink remain in a same operating channel; therefore when the mobile WiFi device switches the channel, a service of an STA, such as a PC (computer), which is connected to the mobile WiFi device, may be interrupted for a period of time.

SUMMARY

Embodiments of the present invention disclose a network access method, device, and system, which can avoid service interruption that occurs when a mobile wireless interconnection device switches a channel.

According to a first aspect, a network access method is provided, and the method includes detecting, by a mobile wireless interconnection device, whether interference exists between a first channel and a second channel. The first channel is between the mobile wireless interconnection device and a station, and the second channel is between the mobile wireless interconnection device and a hotspot access device. When interference is detected by the mobile wireless interconnection device, the mobile wireless interconnection device reduces its own transmit power so that no interference is detected between the first channel and the second channel after reducing its transmit power, and the station accesses the Internet by using the mobile wireless interconnection device and the hotspot access device.

In a first possible implementation manner of the first aspect, the reducing, by the mobile wireless interconnection device, its own transmit power, so that no interference exists between the first channel and the second channel includes reducing, by the mobile wireless interconnection device, its own transmit power level by level, and each time after its own transmit power is reduced, detecting whether interference exists between the first channel and the second channel, until no interference exists between the first channel and the second channel. Alternatively, the method includes reducing, by the mobile wireless interconnection device according to a preset value, its own transmit power by the preset value, so that no interference exists between the first channel and the second channel.

With reference to the first aspect or the first possible implementation manner of the first aspect, in a second possible implementation manner of the first aspect, the detecting, by a mobile wireless interconnection device, whether interference exists between a first channel and a second channel, where the first channel is between the mobile wireless interconnection device and a station, and the second channel is between the mobile wireless interconnection device and a hotspot access device includes detecting, by the mobile wireless interconnection device, whether a signal strength to interference plus noise ratio between the first channel and the second channel is less than or equal to a preset threshold. If the signal strength to interference plus noise ratio between the first channel and the second channel is less than or equal to the preset threshold, determining, by the mobile wireless interconnection device, that interference exists between the first channel and the second channel.

With reference to the first aspect or either of the foregoing possible implementation manners, in a third possible implementation manner, before or after the reducing, by the mobile wireless interconnection device, its own transmit power, if no interference exists between the first channel and the second channel, the method includes maintaining, by the mobile wireless fidelity device, operation in intra-frequency dual-channel mode by means of time division multiplexing when the station and the hotspot access device operate at a same frequency band, so that the station accesses the Internet by using the mobile wireless interconnection device and the hotspot access device. When the station and the hotspot access device operate at different frequency bands, maintaining, by the mobile wireless fidelity device, operation in inter-frequency dual-channel mode by means of time division multiplexing, so that the station accesses the Internet by using the mobile wireless interconnection device and the hotspot access device.

With reference to the first aspect or any one of the foregoing possible implementation manners, in a fourth possible implementation manner, before the detecting, by a mobile wireless interconnection device, whether interference exists between a first channel and a second channel, where the first channel is between the mobile wireless interconnection device and a station, and the second channel is between the mobile wireless interconnection device and a hotspot access device, the method further includes establishing, by the mobile wireless interconnection device, a connection to the station by using the first channel and establishing a connection to the hotspot access device by using the second channel.

With reference to the first aspect or any one of the foregoing possible implementation manners, in a fifth possible implementation manner, after the reducing, by the mobile wireless interconnection device, its own transmit power, if interference still exists between the first channel and the second channel, the method further includes re-switching, by the mobile wireless interconnection device, the first channel between the mobile wireless interconnection device and the station.

According to a second aspect, a mobile wireless interconnection device is provided, and the device includes a detecting module and an access module. The detecting module is configured to detect whether interference exists between a first channel and a second channel, where the first channel is between the mobile wireless interconnection device and a station, and the second channel is between the mobile wireless interconnection device and a hotspot access device. The access module is configured to reduce transmit power of the mobile wireless interconnection device itself when the detecting module detects that interference exists between the first channel and the second channel, so that no interference exists between the first channel and the second channel, and the station accesses the Internet by using the mobile wireless interconnection device and the hotspot access device.

In a first possible implementation manner of the second aspect, the access module includes a first unit configured to reduce the transmit power of the mobile wireless interconnection device level by level, and each time after the transmit power of the mobile wireless interconnection device is reduced, instruct the detecting module to detect whether interference exists between the first channel and the second channel, until no interference exists between the first channel and the second channel; or reduce, according to a preset value, the transmit power of the mobile wireless interconnection device itself by the preset value, so that no interference exists between the first channel and the second channel.

With reference to the second aspect or any one of the foregoing possible implementation manners, in a second possible implementation manner, the detecting module includes a first submodule configured to detect whether a signal strength to interference plus noise ratio between the first channel and the second channel is less than or equal to a preset threshold. A second submodule is configured to determine that interference exists between the first channel and the second channel when a detection result of the first submodule is that the signal strength to interference plus noise ratio is greater than the preset threshold.

With reference to the second aspect or any of the foregoing possible implementation manners of the second aspect, in a third possible implementation manner, the access module includes a second unit configured to maintain operation in intra-frequency dual-channel mode by means of time division multiplexing before or after the access module reduces the transmit power of the mobile wireless interconnection device itself and when the detecting module detects that no interference exists between the first channel and the second channel, and the station and the hotspot access device operate at a same frequency band, so that the station accesses the Internet by using the mobile wireless interconnection device and the hotspot access device. A third unit is configured to maintain operation in inter-frequency dual-channel mode by means of time division multiplexing before or after the access module reduces the transmit power of the mobile wireless interconnection device itself, when the detecting module detects that no interference exists between the first channel and the second channel, and the station and the hotspot access device operate at different frequency bands, so that the station accesses the Internet by using the mobile wireless interconnection device and the hotspot access device.

With reference to the second aspect or any one of the foregoing possible implementation manners of the second aspect, in a fourth possible implementation manner, the device further includes a connecting module, configured to establish a connection to the station by using the first channel and establish a connection to the hotspot access device by using the second channel.

With reference to the second aspect or any one of the foregoing possible implementation manners of the second aspect, in a fifth possible implementation manner, the device further includes a channel switching module, configured to: if interference still exists between the first channel and the second channel after the access module reduces the transmit power of the mobile wireless interconnection device itself, re-switch the first channel between the mobile wireless interconnection device and the station.

According to a third aspect, a network access system is provided, which includes a hotspot access device, a station, and the mobile wireless interconnection device according to the foregoing second aspect.

In embodiments of the present invention, a mobile wireless interconnection device may detect whether interference exists between a first channel and a second channel, where the first channel is between the mobile wireless interconnection device and a station, and the second channel is between the mobile wireless interconnection device and a hotspot access device.

When detecting that interference exists, the mobile wireless interconnection device may reduce its own transmit power, so that no interference exists between the first channel and the second channel, and the station accesses the Internet by using the mobile wireless fidelity device and the hotspot access device. According to the embodiments of the present invention, the mobile wireless interconnection device can, when detecting that its own operating channel does not meet a communication requirement, reduce its own transmit power, so that an STA accesses the Internet by using a mobile WiFi device and the hotspot access device, thereby avoiding network interruption caused by channel switching and improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention disclose a network access method, device, and system, which can avoid service interruption that occurs when a mobile wireless interconnection device switches a channel. The following separately gives detailed descriptions, where the mobile wireless interconnection device is a mobile WiFi device.

Figure 1:
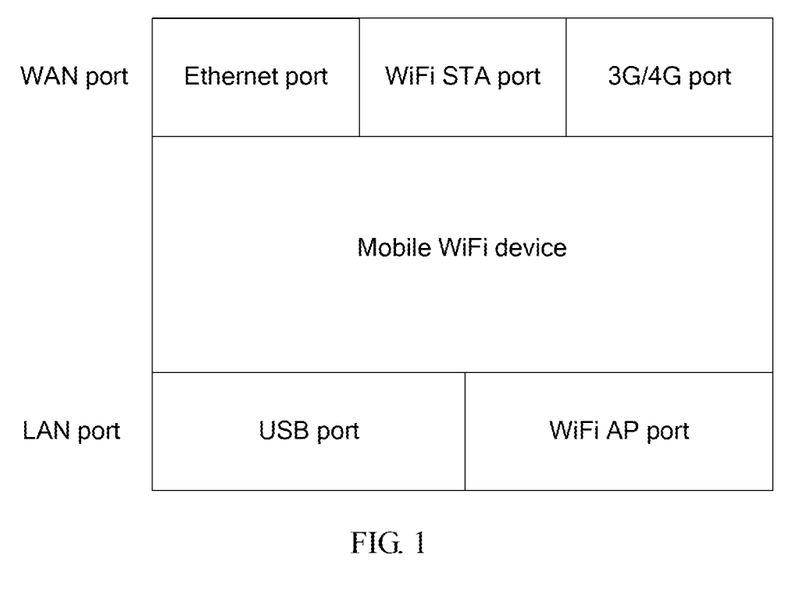
FIG. 1 is a schematic diagram of ports of a mobile WiFi device according to an embodiment of the present invention.

The mobile WiFi device in the embodiments of the present invention may be named E5. Refer to FIG. 1, which is a schematic diagram of ports of the E5. The E5 may include a WAN port and a LAN port, where the WAN port includes an Ethernet port, a WiFi STA port, and a cellular wireless communications network port, and is specifically described by using a 3G/4G port as an example; and the LAN port includes a Universal Serial Bus (USB) port and a WiFi AP port. The WAN port may enable the mobile WiFi device to connect, as a device that has a requirement for accessing the Internet, to another access point. The LAN port may enable the mobile WiFi device to serve as a serving node for serving another device that has a requirement for accessing the Internet.

The mobile WiFi device (E5) may work in the following scenarios.

Scenario 1: The E5 provides a LAN service for a user by using the USB port or the WiFi AP port, such as WebNAS file sharing, Samba, and Digital Living Network Alliance (Digital Living Network Alliance, DLNA) streaming media playing and recording.

Scenario 2: The E5 provides a WAN service for a user that is connected by using the USB port, and the WAN port, such as the Ethernet, the WiFi STA, and the 3G/4G port, may be used to access the Internet, surf the Internet, and the like.

Scenario 3: With reference to scenario 1 and scenario 2, the E5 concurrently provides the foregoing WAN service and the LAN service for a user.

Figure 2:
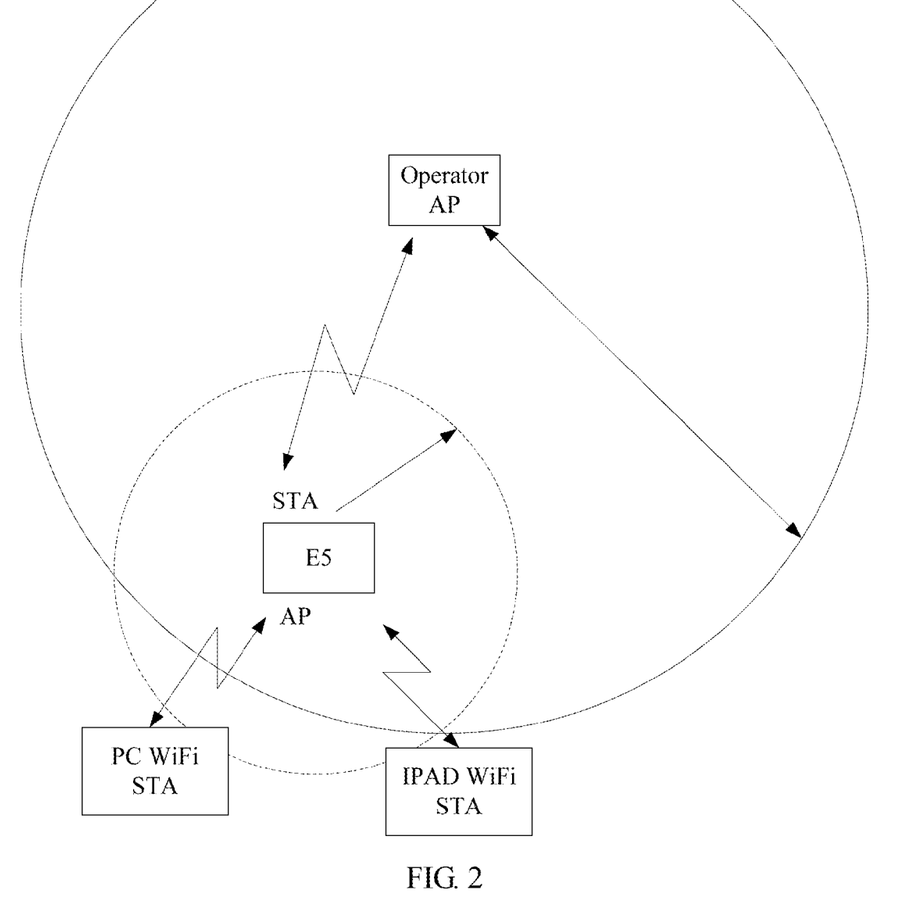
FIG. 2 is a schematic diagram of interactions between a mobile WiFi device and an STA and between the mobile WiFi device and an operator AP according to an embodiment of the present invention.

Referring to FIG. 2, in scenario 3, data traffic may be offloaded to a WiFi network. After the data traffic is offloaded to the WiFi network, the E5 may first receive, as a WiFi AP, data from an external PC/iPad; then the E5 further sends, as a WiFi STA, the data to an operator AP; similarly, data from the operator AP may also be sent to the PC/iPad by using the E5. In this case, the 3G/4G port of the E5 may be off work, which reduces pressure on the bandwidth of an operator data network.

Figure 3:
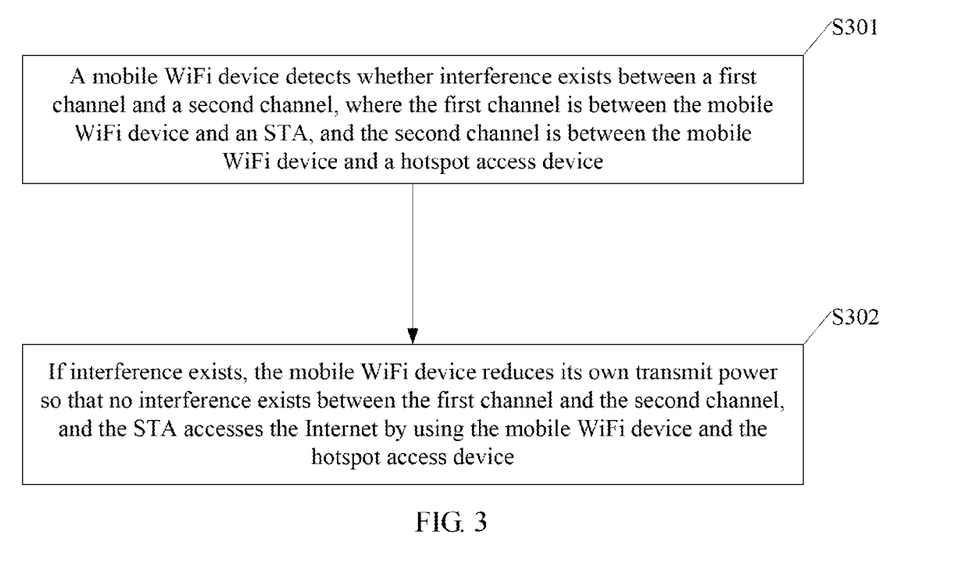
FIG. 3 is a flowchart of a network access method according to an embodiment of the present invention.

Refer to FIG. 3. FIG. 3 shows a flowchart of a network access method according to an embodiment of the present invention. As shown in FIG. 3, the network access method may include the following steps.

S301: A mobile WiFi device detects whether interference exists between a first channel and a second channel. The first channel is between the mobile WiFi device and an STA, and the second channel is between the mobile WiFi device and a hotspot access device.

Specifically, the mobile WiFi device selects an initial operating channel (that is, the first channel) and runs normally; the STA (for example, a PC, or a smartphone) connects to the mobile WiFi device by using the first channel; and the mobile WiFi device further scans to find an available third-party hotspot access device (for example, a WiFi AP) and connects to the hotspot access device by using the second channel, so as to successfully access the Internet by using the hotspot access device. Then the mobile WiFi device detects whether interference exists between the first channel and the second channel, that is, whether a signal strength to interference plus noise ratio (SINR) between the first channel and the second channel is less than or equal to a preset threshold; if the SINR is less than or equal to the preset threshold, the mobile WiFi device may determine that no interference exists between the first channel and the second channel; if the SINR is greater than the preset threshold, the mobile WiFi device may determine that interference exists between the first channel and the second channel. For example, the preset threshold is 1. If the SINR is less than or equal to 1, for example, a valid signal strength is −50 db and interference plus noise strength is −70 db, the mobile WiFi device may determine that no interference exists between the first channel and the second channel; if the SINR is greater than 1, for example, the valid signal strength is −70 db and the interference plus noise is −50 db, the mobile WiFi device may determine that interference exists between the first channel and the second channel.

S302: If interference exists, the mobile WiFi device reduces its own transmit power, so that no interference exists between the first channel and the second channel, and the STA accesses the Internet by using the mobile WiFi device and the hotspot access device.

Specifically, when a detection result in step S301 indicates that interference exists between the first channel and the second channel, the mobile WiFi device may reduce its own transmit power. The value of the SINR between the first channel and the second channel becomes smaller because the mobile WiFi device reduces its own transmit power. Therefore, when no interference exists between the first channel and the second channel after the mobile WiFi device reduces its own transmit power, the STA may access the Internet by using the mobile WiFi device and the hotspot access device, thereby avoiding a period of network interruption that occurs when the mobile WiFi device switches a downlink channel. The mobile WiFi device may maintain the first channel and the second channel by means of time division multiplexing, so that the STA accesses the Internet by using the mobile WiFi device and the hotspot access device. When the STA and the hotspot access device operate at a same frequency band, for example, they both operate at 2.4 GHz, the mobile WiFi device maintains operation in intra-frequency dual-channel mode or in intra-frequency co-channel mode by means of time division multiplexing, so that the STA accesses the Internet by using the mobile WiFi device and the hotspot access device. When the STA and the hotspot access device operate at different frequency bands, for example, the STA operates at 2.4 GHz whereas the hotspot access device operates at 5 GHz, the mobile WiFi device maintains operation in inter-frequency dual-channel mode by means of time division multiplexing, so that the STA accesses the Internet by using the mobile WiFi device and the hotspot access device. A time division interval of the time division multiplexing that is used by the mobile WiFi device to maintain the first channel and the second channel may be configured according to a service requirement, for example, the mobile WiFi device maintains communication with the STA for a longer time by using the first channel. In addition, the mobile WiFi device may reduce its own transmit power level by level, and each time after its own transmit power is reduced, detects whether interference exists between the first channel and the second channel, until no interference exists between the first channel and the second channel; or the mobile WiFi device reduces, according to a preset value, its own transmit power by the preset value, so that no interference exists between the first channel and the second channel.

In the network access method provided in FIG. 3, a mobile WiFi device may, when detecting that its own operating channel does not meet a communication requirement, reduce its own transmit power to maintain dual channels so that an STA accesses the Internet by using the mobile WiFi device and a hotspot access device, thereby avoiding network connection interruption and further improving user experience.

Figure 4:
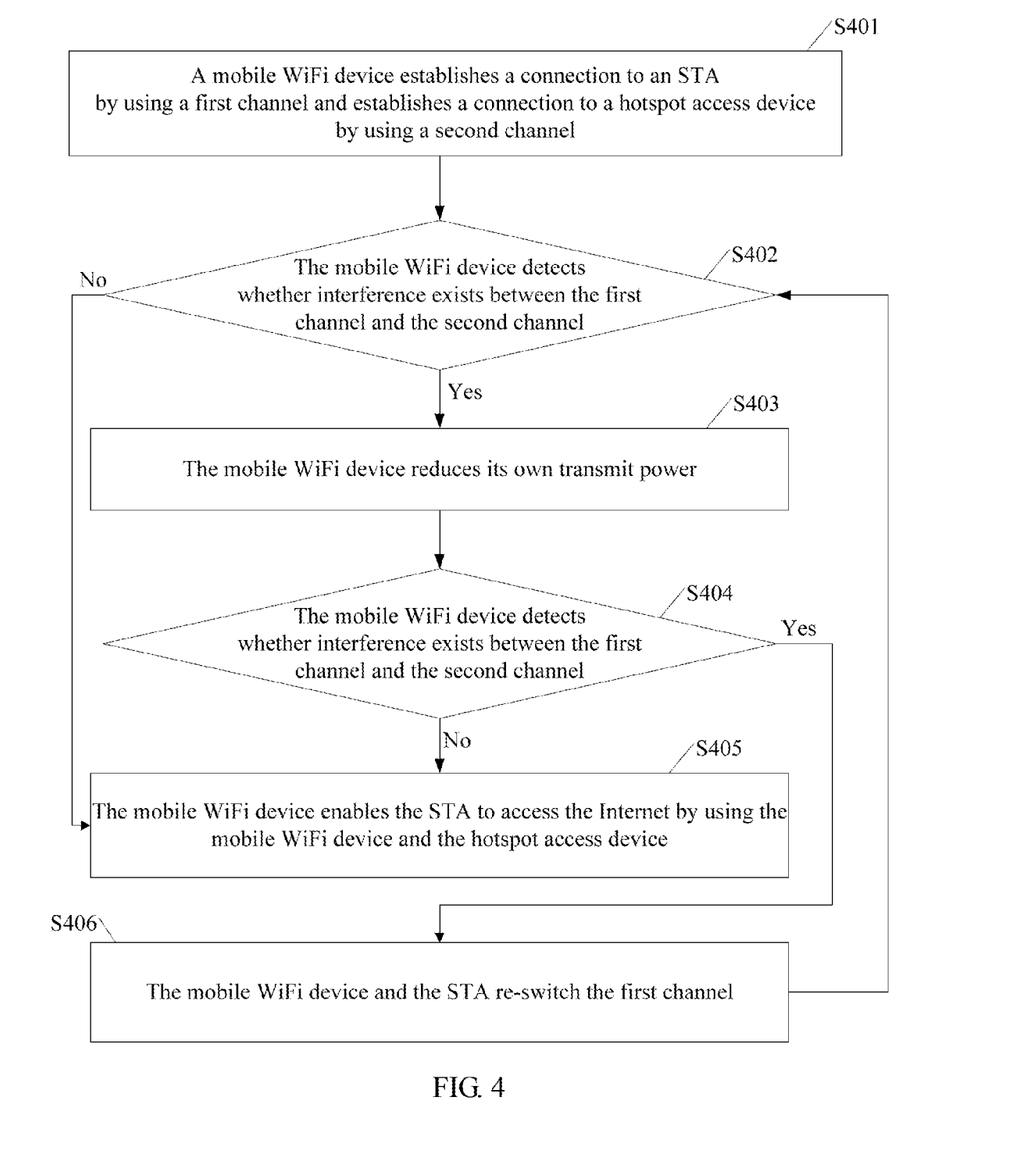
FIG. 4 is a flowchart of another network access method according to an embodiment of the present invention.

FIG. 4 shows a flowchart of another network access method according to an embodiment of the present invention. As shown in FIG. 4, the network access method includes the following steps.

S401: A mobile WiFi device establishes a connection to an STA by using a first channel and establishes a connection to a hotspot access device by using a second channel.

Specifically, when the mobile WiFi device enters a coverage area of a hotspot access device (for example, a WiFi AP), the STA may access the Internet by using the mobile WiFi device and a WiFi network. In this case, the mobile WiFi device establishes the connection to the STA by using the first channel, and then the mobile WiFi device establishes the connection to the hotspot access device by using the second channel.

S402: The mobile WiFi device detects whether interference exists between the first channel and the second channel.

Specifically, the mobile WiFi device may detect whether a signal strength to interference plus noise ratio SINR between the first channel and the second channel is less than or equal to a preset threshold; if the SINR is less than or equal to the preset threshold, the mobile WiFi device may determine that no interference exists between the first channel and the second channel; if the SINR is greater than the preset threshold, the mobile WiFi device may determine that interference exists between the first channel and the second channel. Optionally, the preset threshold is 1. If the SINR is less than or equal to 1, for example, a valid signal strength is −50 db and interference plus noise is −70 db, the mobile WiFi device may determine that no interference exists between the first channel and the second channel; if the SINR is greater than 1, for example, the valid signal strength is −70 db and the interference plus noise is −50 db, the mobile WiFi device may determine that interference exists between the first channel and the second channel. If interference is detected, go to step S403 in this process; if no interference is detected, go to step S405 in this process.

S403: The mobile WiFi device reduces its own transmit power.

Specifically, an extent to which the transmit power is reduced may depend on a specific condition of the mobile WiFi device, the STA, and the hotspot access device. A purpose of reducing the transmit power is to reduce the SINR of the mobile WiFi device, so that the SINR is less than or equal to the threshold, and therefore no interference exists between the first channel and the second channel.

The mobile wireless interconnection device may reduce its own transmit power level by level, and each time after its own transmit power is reduced, detect whether interference exists between the first channel and the second channel, until no interference exists between the first channel and the second channel.

Optionally, the mobile wireless interconnection device may further reduce, according to a preset value, its own transmit power by the preset value, so that no interference exists between the first channel and the second channel.

S404: The mobile WiFi device detects whether interference exists between the first channel and the second channel.

Specifically, the step in which the mobile WiFi device re-detects whether interference exists between the first channel and the second channel is the same as step S402. If it is detected that no interference exists, go to step S405 in this process; if interference is still detected, go to step S406 in this process.

S405: The mobile WiFi device enables the STA to access the Internet by using the mobile WiFi device and the hotspot access device.

Specifically, the mobile WiFi device may maintain the first channel and the second channel by means of time division multiplexing, so that the STA accesses the Internet by using the mobile WiFi device and the hotspot access device. When the STA and the hotspot access device operate at a same frequency band, for example, they both operate at 2.4 GHz, the mobile WiFi device maintains operation in intra-frequency dual-channel mode by means of time division multiplexing, so that the STA accesses the Internet by using the mobile WiFi device and the hotspot access device. When the STA and the hotspot access device operate at different frequency bands, for example, the STA operates at 2.4 GHz whereas the hotspot access device operates at 5 GHz, the mobile WiFi device maintains operation in inter-frequency dual-channel mode by means of time division multiplexing, so that the STA accesses the Internet by using the mobile WiFi device and the hotspot access device. In addition, a time division interval of the time division multiplexing that is used by the mobile WiFi device to maintain the first channel and the second channel may be configured according to a service requirement, for example, the mobile WiFi device maintains communication with the STA for a longer time by using the first channel.

S406: The mobile WiFi device and the STA re-switch the first channel.

Specifically, because an operating channel of the mobile WiFi device still cannot meet a communication requirement after its own transmit power is reduced, that is, interference still exists between the first channel and the second channel, the mobile WiFi device may enable the STA to initiate a new connection to the mobile WiFi device to cause the WiFi device to re-switch the first channel, and the mobile WiFi device may perform step S402 again to detect whether interference exists between the first channel and the second channel, and enable the STA to reattempt to access the Internet by using the mobile WiFi device and the hotspot access device.

It should be noted that, in this implementation manner, before the mobile WiFi device and the STA re-switch the first channel, the number of times that the mobile WiFi device reduces the transmit power is only one, but the mobile WiFi device may further use a method of reducing its transmit power for multiple times, in a case in which a total time limit (for example, 3S) for the mobile WiFi device to connect to the STA and the hotspot access device is not exceeded, so that the SINR between the first channel and the second channel meets the communication requirement.

In the dual-channel access method provided in FIG. 4, a mobile WiFi device may, when detecting that its own operating channel does not meet a communication requirement, reduce its own transmit power, so that an STA accesses the Internet by using the mobile WiFi device and a hotspot access device, thereby avoiding network interruption caused by channel switching and further improving user experience.

Figure 5:
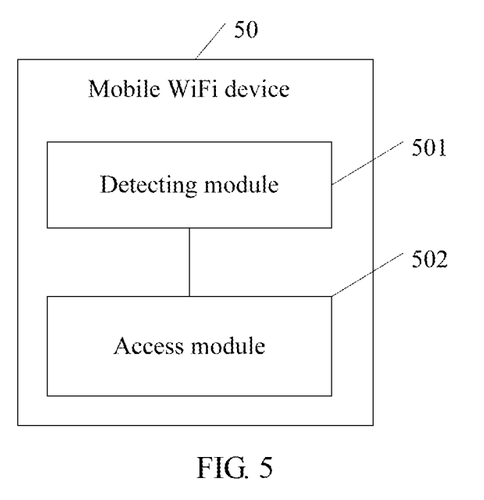
FIG. 5 is a schematic structural diagram of a mobile WiFi device according to an embodiment of the present invention.

FIG. 5 shows a schematic structural diagram of a mobile WiFi device according to an embodiment of the present invention. As shown in FIG. 5, the mobile WiFi device 50 may include a detecting module 501 and an access module 502.

The detecting module 501 is configured to detect whether interference exists between a first channel and a second channel. The first channel is between the mobile WiFi device 50 and an STA, and the second channel is between the mobile WiFi device 50 and a hotspot access device. Specifically, the detecting module 501 may determine, by detecting an SINR between the first channel and the second channel, whether interference exists between the first channel and the second channel; if the SINR is less than or equal to a preset threshold, determine that no interference exists between the first channel and the second channel. Optionally, the preset threshold is 1. If the SINR is less than or equal to 1, for example, a valid signal strength is −50 db and interference plus noise is −70 db, determine that no interference exists between the first channel and the second channel; if the SINR is greater than 1, for example, the valid signal strength is −70 db and interference plus noise is −50 db, determine that interference exists between the first channel and the second channel.

The access module 502 is configured to: when a detection result of the detecting module 501 is that interference exists, reduce transmit power of the mobile WiFi device 50 itself, so that no interference exists between the first channel and the second channel, and the STA accesses the Internet by using the mobile WiFi device 50 and the hotspot access device. The WiFi device 50 may maintain the first channel and the second channel by means of time division multiplexing, so that the STA accesses the Internet by using the mobile WiFi device 50 and the hotspot access device.

The mobile WiFi device provided in FIG. 5 may, when detecting that its own operating channel does not meet a communication requirement, reduce its own transmit power, so that an STA accesses the Internet by using the mobile WiFi device and a hotspot access device, thereby avoiding network connection interruption and further improving user experience.

Figure 6:
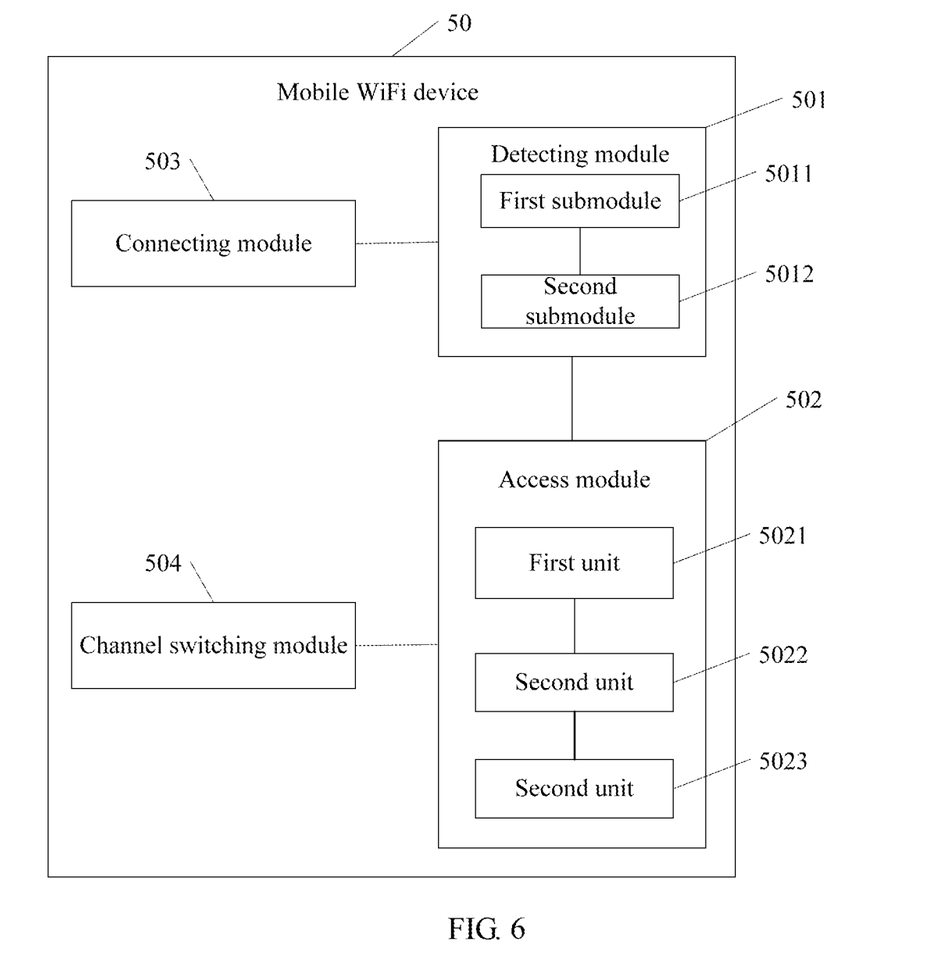
FIG. 6 is a schematic structural diagram of another mobile WiFi device according to an embodiment of the present invention.

FIG. 6 shows a schematic structural diagram of another mobile WiFi device according to an embodiment of the present invention, where the mobile WiFi device shown in FIG. 6 is obtained by optimizing the mobile WiFi device shown in FIG. 5. In the mobile WiFi device 50 shown in FIG. 6, a detecting module 501 specifically includes a first submodule 5011 and a second submodule 5012; an access module 502 specifically includes a first unit 5021, a second unit 5022, and a third unit 5023; and the mobile WiFi device 50 shown in FIG. 6 further includes a connecting module 503 and a channel switching module 504.

The first submodule 5011 is configured to detect whether a signal strength to interference plus noise ratio SINR between a first channel and a second channel is less than or equal to a preset threshold, for example, the preset threshold is 1.

The second submodule 5012 is configured to: when a detection result of the first submodule 5011 is that the SINR is greater than the preset threshold, determine that interference exists between the first channel and the second channel; or when a detection result of the first submodule 5011 is that the SINR is less than or equal to the preset value, determine that no interference exists between the first channel and the second channel.

Further, the first unit 5021 is configured to reduce transmit power of the mobile WiFi device 50 level by level, and each time after the transmit power of the mobile WiFi device 50 is reduced, instruct the detecting module 501 to detect whether interference exists between the first channel and the second channel, until no interference exists between the first channel and the second channel; or reduce, according a preset value, the transmit power of the mobile WiFi device 50 by the preset value, so that no interference exists between the first channel and the second channel.

The second unit 5022 is configured to: before or after the access module 502 reduces the transmit power of the mobile WiFi device 50, when a detection result of the detection module 501 is that no interference exists between the first channel and the second channel, and an STA and a hotspot access device operate at a same frequency band, for example, they operate at 2.4 GHz, maintain operation in intra-frequency dual-channel mode or in intra-frequency co-channel mode by means of time division multiplexing, so that the STA accesses the Internet by using the mobile WiFi device 50 and the hotspot access device.

The third unit 5023 is configured to: before or after the access module 502 reduces the transmit power of the mobile WiFi device 50, when a detection result of the detection module 501 is that no interference exists between the first channel and the second channel, and the STA and the hotspot access device operate at different frequency bands, for example, the STA operates at 2.4 GHz whereas the hotspot access device operates at 5 GHz, maintain operation in inter-frequency dual-channel mode by means of time division multiplexing, so that the STA accesses the Internet by using the mobile WiFi device 50 and the hotspot access device. In addition, a time division interval of the time division multiplexing that is used by the mobile WiFi device 50 to maintain the first channel and the second channel may be configured according to a requirement, for example, the mobile WiFi device 50 maintains communication with the STA for a longer time by using the first channel.

Further, the mobile WiFi device 50 shown in FIG. 6 further includes the connecting module 503 and the channel switching module 504.

The connecting module 503 is configured to establish a connection to the STA by using the first channel and establish a connection to the hotspot access device by using the second channel.

The channel switching module 504 is configured to: if interference still exists between the first channel and the second channel after the access module 502 reduces the transmit power of the mobile WiFi device 50, re-switch the first channel between the mobile WiFi device 50 and the STA, so that the STA reattempts to access the Internet by using the mobile WiFi device 50 and the hotspot access device.

The mobile WiFi device provided in FIG. 6 may, when detecting that its own operating channel does not meet a communication requirement, reduce its own transmit power, so that an STA accesses the Internet by using the mobile WiFi device and a hotspot access device, thereby avoiding network interruption caused by channel switching and further improving user experience.

Figure 7:
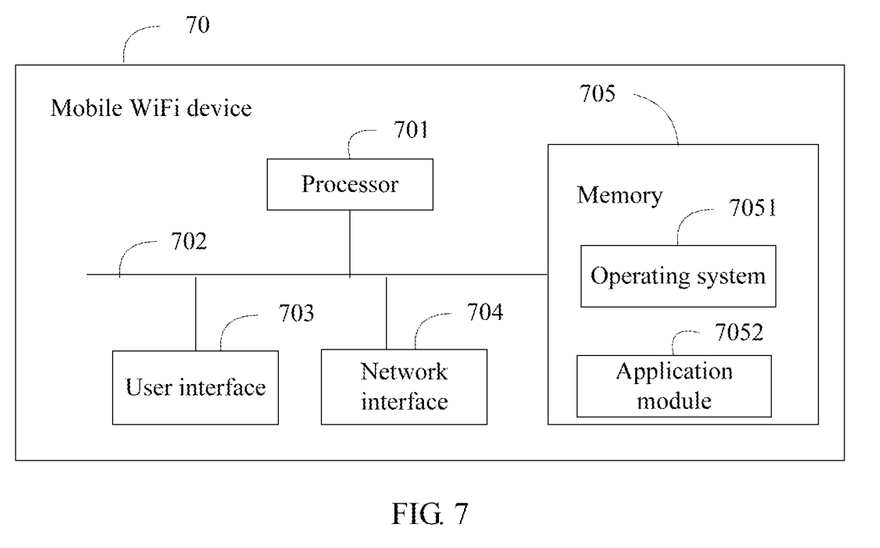
FIG. 7 is a schematic structural diagram of still another mobile WiFi device according to an embodiment of the present invention

FIG. 7 is a structural diagram of another mobile WiFi device disclosed in an embodiment of the present invention, and is used to perform a dual-channel network access method disclosed in this embodiment of the present invention. As shown in FIG. 7, the mobile WiFi device 70 includes: at least one processor 701, for example, a CPU, at least one network interface 704 or another user interface 703, a memory 705, and at least one communications bus 702. The communications bus 702 is configured to implement a connection and communication among these components. The user interface 703 may optionally include a USB interface and anther standard interface and wired interface. The network port 704 may optionally include an Ethernet port, a WiFi STA port, a WiFi AP port, a cellular wireless communications network port, and other wireless interfaces. The memory 705 may include a high-speed RAM memory, and may further include a non-volatile memory, for example, at least one disk memory. The memory 705 may optionally include at least one storage apparatus that is located far away from the foregoing processor 701.

In some implementation manners, the memory 705 stores the following elements: an executable module or a data structure, or a subset thereof, or an extended set thereof.

An operating system 7051 includes various system programs, which are used to implement various basic services and process hardware-based tasks.

An application module 7052 includes various application programs, such as a device control service program and a device identification service program, which are used to implement various application services.

Specifically, the processor 701 is configured to invoke a program stored in the memory 705 to implement the following operations. Upon execution of the program, the processor 701 detects whether interference exists between a first channel and a second channel. The first channel is between the mobile WiFi device 70 and an STA (for example, a PC/iPad), and the second channel is between the mobile WiFi device 70 and a hotspot access device (for example, a WiFi AP). If interference exists, the processor 701 reduces the transmit power of the mobile WiFi device 70, so that no interference exists between the first channel and the second channel, and the STA accesses the Internet by using the mobile WiFi device 70 and the hotspot access device.

In an embodiment, a specific manner used by the processor 701 to reduce the transmit power of the mobile WiFi device 70 so that no interference exists between the first channel and the second channel is that: the processor 701 reduces the transmit power of the mobile WiFi device 70 level by level, and each time after the transmit power of the mobile WiFi device 70 is reduced, detects whether interference exists between the first channel and the second channel, unit no interference exists between the first channel and the second channel.

In an embodiment, a specific manner used by the processor 701 to reduce the transmit power of the mobile WiFi device 70 so that no interference exists between the first channel and the second channel is that: the processor 701 reduces, according to a preset value, the transmit power of the mobile WiFi device 70 by the preset value, so that no interference exists between the first channel and the second channel.

In an embodiment, a specific manner used by the processor 701 to detect whether interference exists between the first channel and the second channel is that: the processor 701 detects whether an SINR between the first channel and the second channel is less than or equal to a preset threshold (for example, 1); if the SINR between the first channel and the second channel is less than or equal to the preset threshold, determines that no interference exists between the first channel and the second channel; if the SINR between the first channel and the second channel is greater than the preset threshold, determines that interference exists between the first channel and the second channel.

In an embodiment, before or after the processor 701 reduces the transmit power of the mobile WiFi device 70, when the processor 701 detects that no interference exists between the first channel and the second channel, a manner used by the processer 701 to enable the STA to access the Internet by using the mobile WiFi device 70 and the hotspot access device is that: the processor 701 may maintain the first channel and the second channel by means of time division multiplexing, so that the STA accesses the Internet by using the mobile WiFi device 70 and the hotspot access device. Specifically, when the STA and the hotspot access device operate at a same frequency band, for example, they both operate at 2.4 GHz, the mobile WiFi device 70 maintains operation in intra-frequency dual-channel mode or in intra-frequency co-channel mode by means of time division multiplexing, so that the STA accesses the Internet by using the mobile WiFi device 70 and the hotspot access device. When the STA and the hotspot access device operate at different frequency bands, for example, the STA operates at 2.4 GHz whereas the hotspot access device operates at 5 GHz, the mobile WiFi device 70 maintains operation in inter-frequency dual-channel mode, so that the STA accesses the Internet by using the mobile WiFi device 70 and the hotspot access device. In addition, a time division interval of the time division multiplexing that is used by the mobile WiFi device 70 to maintain the first channel and the second channel may be configured according to a requirement, for example, the mobile WiFi device 70 maintains communication with the STA for a longer time by using the first channel.

Optionally, the processor 701 is further configured to establish a connection to the STA by using the first channel and establish a connection to the hotspot access device by using the second channel.

Optionally, the processor 701 is further configured to: if interference still exists between the first channel and the second channel after the processor 701 reduces the transmit power of the mobile WiFi device 70, re-switch the first channel between the mobile WiFi device 70 and the STA, so that the STA reattempts to access the Internet by using the mobile WiFi device 70 and the hotspot access device.

The mobile WiFi device provided in FIG. 7 may, when detecting that its own operating channel does not meet a communication requirement, reduce its own transmit power, so that an STA accesses the Internet by using the mobile WiFi device and a hotspot access device, thereby avoiding network interruption caused by channel switching and further improving user experience.

As shown in FIG. 2, an embodiment of the present invention further provides a network access system. The network access system includes a mobile WiFi device (that is, E5), an operator AP (for example, a WiFi AP), and an STA (for example, a PC/iPad). The mobile WiFi device may be the mobile WiFi device 50 shown in FIG. 5 or FIG. 6, or the mobile WiFi device 70 shown in FIG. 7. For a structure and a function of the mobile WiFi device, reference may be made to the foregoing descriptions for FIG. 5, FIG. 6, and FIG. 7, and therefore no further details are provided herein.

The network access system provided in FIG. 2 may, when detecting that its own operating channel does not meet a communication requirement, reduce its own transmit power, so that an STA accesses the Internet by using a mobile WiFi device and a hotspot access device, thereby avoiding network interruption caused by channel switching and further improving user experience.

Persons of ordinary skill in the art may understand that all or a part of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disk.

The foregoing gives detailed descriptions on the network access method, mobile WiFi device provided by embodiments of the present invention. In this specification, specific examples are used to describe the principle and implementation manners of the present invention, and the description of the embodiments is only intended to make the method and core idea of the present invention more comprehensible. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A network access method, the method comprising:
    establishing, by a mobile wireless interconnection device, a first connection between a mobile wireless interconnection device and a station using a first channel;
    establishing, by the mobile wireless interconnection device, a second connection between the mobile wireless interconnection device and a hotspot access device using a second channel;
    detecting, by the mobile wireless interconnection device, a first signal strength to interference plus noise ratio between the first channel and the second channel;
    determining, by the mobile wireless interconnection device, that interference exists between the first channel and the second channel while the first signal strength to interference plus noise ratio is greater than a preset threshold, wherein the mobile wireless interconnection device is coupled to the Internet using a wireless local area network of the hotspot access device;
    after determining that interference exists, reducing, by the mobile wireless interconnection device, a transmit power of the mobile wireless interconnection device;
    detecting, by the mobile wireless interconnection device and after reducing the transmit power, a second signal strength to interference plus noise ratio between the first channel and the second channel;
    determining, by the mobile wireless interconnection device, a duration of time spent by the wireless mobile interconnection device connecting to the station and the hotspot access device;
    switching, by the mobile wireless interconnection device the, first channel between the mobile wireless interconnection device and the station to a third channel different from both the first channel and the second channel, wherein the switching is performed as a result of the second signal strength to interference plus noise ratio being greater than the preset threshold and the duration of time spent exceeding a total time limit for the mobile wireless interconnection device to connect to the station and the hotspot access device; and
    determining, by the mobile wireless interconnection device and as a result of the second signal strength to interference plus noise ratio being less than or equal to the preset threshold, the absence of any interference between the first channel and the second channel by the mobile wireless interconnection device, wherein the station accesses the Internet by using the mobile wireless interconnection device and the hotspot access device using the wireless local area network, and wherein the mobile wireless interconnection device is a serving node of the station.

2. The network access method according to claim 1, wherein the reducing of the transmit power comprises:
    reducing, by the mobile wireless interconnection device, the transmit power of the mobile wireless interconnection device level by level, and each time after the transmit power is reduced, determining whether any interference exists between the first channel and the second channel.

3. The network access method according to claim 1, wherein the reducing of the transmit power comprises:
    reducing, by the mobile wireless interconnection device according to a preset value, the transmit power by the preset value.

4. The network access method according to claim 1, the method further comprising:
    after detecting the absence of any interference between the first channel and the second channel
        while the station and the hotspot access device operate at a same frequency band, maintaining, by the mobile wireless interconnection device, operation in intra-frequency dual-channel mode using time division multiplexing, so that the station accesses the Internet by using the mobile wireless interconnection device and the hotspot access device using the wireless local area network; and
        while the station and the hotspot access device operate at different frequency bands, maintaining, by the mobile wireless interconnection device, operation in inter-frequency dual-channel mode using time division multiplexing, so that the station accesses the Internet by using the mobile wireless interconnection device and the hotspot access device using the wireless local area network.

5. The network access method according to claim 1, wherein a first communication occurs between the station and the hotspot access device using the first channel and the second channel before detecting the first signal strength to interference plus noise ratio, and wherein a second communication occurs between the station and the hotspot access device using the first channel and the second channel after the reducing of the transmit power of the mobile wireless interconnection device.

6. The network access method according to claim 1, wherein detecting the absence of any interference between the first channel and the second channel comprises determining that the second signal strength to interference plus noise ratio is less than or equal to the preset threshold.

7. The network access method according to claim 1, wherein the mobile wireless interconnection device concurrently provides a local area network service and a wide area network service to the station.

8. The network access method according to claim 1, wherein the switching the first channel comprises:
instructing, by the mobile wireless interconnection device, the station to initiate a new connection to the mobile wireless interconnection device; and
switching, by the mobile wireless interconnection device and as a result of the new connection being initiated, the first channel to the third channel.

9. A mobile wireless interconnection device comprising:
a processor; and
a memory storing a program to be executed by the processor, the program comprising instructions for:
establishing a first connection between the mobile wireless interconnection device and a station using a first channel,
establishing a second connection between the mobile wireless interconnection device and a hotspot access device using a second channel,
detecting a first signal strength to interference plus noise ratio between the first channel and the second channel,
determining that interference exists between the first channel and the second channel while the first signal strength to interference plus noise ratio is greater than a preset threshold, wherein the mobile wireless interconnection device is coupled to the Internet using a wireless local area network of the hotspot access device,
reducing a transmit power of the mobile wireless interconnection device after determining that interference exists,
detecting a second signal strength to interference plus noise ratio between the first channel and the second channel after reducing the transmit power,
determining a duration of time spent by the wireless mobile interconnection device connecting to the station and the hotspot access device,
switching the first channel between the mobile wireless interconnection device and the station to a third channel different from both the first channel and the second channel, wherein the switching is performed as a result of the second signal strength to interference plus noise ratio being greater than the preset threshold and the duration of time spent exceeding a total time limit for the mobile wireless interconnection device to connect to the station and the hotspot access device, and
determining as a result of the second signal strength to interference plus noise ration being less than or equal to the preset threshold, the absence of any interference between the first channel and the second channel is detected by the mobile wireless interconnection device after reducing the transmit power, wherein the station accesses the Internet by using the mobile wireless interconnection device and the hotspot access device using the wireless local area network, and wherein the mobile wireless interconnection device is a serving node of the station.

10. The mobile wireless interconnection device according to claim 9, wherein the program further comprises instructions for:
reducing the transmit power of the mobile wireless interconnection device level by level, and each time after the transmit power of the mobile wireless interconnection device is reduced, determining whether interference exists between the first channel and the second channel.

11. The mobile wireless interconnection device according to claim 9, wherein the program further comprises instructions for:
reducing, according to a preset value, the transmit power of the mobile wireless interconnection device by the preset value.

12. The mobile wireless interconnection device according to claim 9, wherein the program further comprises instructions for:
after reducing the transmit power of the mobile wireless interconnection device, when the absence of any interference between the first channel and the second channel is detected, and while the station and the hotspot access device operate at a same frequency band, maintaining operation in intra-frequency dual-channel mode using time division multiplexing, so that the station accesses the Internet by using the mobile wireless interconnection device and the hotspot access device using the wireless local area network; and
after reducing the transmit power of the mobile wireless interconnection device, when the absence of any interference between the first channel and the second channel is detected, and while the station and the hotspot access device operate at different frequency bands, maintaining operation in inter-frequency dual-channel mode using time division multiplexing, so that the station accesses the Internet by using the mobile wireless interconnection device and the hotspot access device using the wireless local area network.

13. The mobile wireless interconnection device according to claim 9, wherein the mobile wireless interconnection device concurrently provides a local area network service and a wide area network service to the station.

14. The mobile wireless interconnection device according to claim 9, wherein the program further comprises instructions for:
instructing the station to initiate a new connection to the mobile wireless interconnection device; and
switching, as a result of the new connection being initiated, the first channel to the third channel.

15. A network access system, the system comprising a hotspot access device, a station, and a mobile wireless interconnection device, wherein the mobile wireless interconnection device comprises:
a network interface, wherein the network interface is configured to:
establish a first connection between the mobile wireless interconnection device and a station using a first channel,
establish a second connection between the mobile wireless interconnection device and a hotspot access device using a second channel,
reduce a transmit power of the mobile wireless interconnection device after determining that interference exists between the first channel and the second channel, and
switch the first channel between the mobile wireless interconnection device and the station to a third channel different from both the first channel and the second channel, wherein the station accesses the Internet by using the mobile wireless interconnection device and the hotspot access device using a wireless local area network, and wherein the mobile wireless interconnection device is a serving node of the station;

a processor;

a memory storing a program to be executed in the processor, the program comprising instructions that cause the processor to:

detect a first signal strength to interference plus noise ratio between the first channel and the second channel, detect a second signal strength to interference plus noise ratio between the first channel and the second channel after reducing the transmit power, determine that interference exists between the first channel and the second channel while the first signal strength to interference plus noise ratio is greater than a preset threshold, determine a duration of time spent by the wireless mobile interconnection device connecting to the station and the hotspot access device, wherein the switch of the first channel is performed as a result of the second signal strength to interference plus noise ratio being greater than the preset threshold and the duration of time spent exceeding a total time limit for the mobile wireless interconnection device to connect to the station and the hotspot access device, and determine the absence of any interference between the first channel and the second channel as a result of the second signal strength to interference plus noise ratio being less than or equal to the preset threshold, wherein the mobile wireless interconnection device is coupled to the Internet using the wireless local area network of the hotspot access device; and a communications bus, wherein the communications bus is configured to:

implement a connection and communication among the processor and the network interface.

\* \* \* \* \*